US009659442B2

(12) United States Patent
Acres

(10) Patent No.: US 9,659,442 B2
(45) Date of Patent: May 23, 2017

(54) SYSTEM AND METHOD FOR MEASURING GAMING PLAYER BEHAVIOR

(75) Inventor: John F. Acres, Las Vegas, NV (US)

(73) Assignee: PATENT INVESTMENT & LICENSING COMPANY, Las Vegas, NV (US)

( * ) Notice: Subject to any disclaimer, the term of this patent is extended or adjusted under 35 U.S.C. 154(b) by 1247 days.

(21) Appl. No.: 12/634,646

(22) Filed: Dec. 9, 2009

(65) Prior Publication Data

US 2011/0111836 A1 May 12, 2011

Related U.S. Application Data

(63) Continuation-in-part of application No. 12/616,070, filed on Nov. 10, 2009, now abandoned.

(51) Int. Cl.
*A63F 13/00* (2014.01)
*G07F 17/32* (2006.01)

(52) U.S. Cl.
CPC .......... *G07F 17/3234* (2013.01); *G07F 17/32* (2013.01); *G07F 17/3237* (2013.01)

(58) Field of Classification Search
CPC ... G07F 17/3234; G07F 17/3237; G07F 17/32
USPC .......................................................... 463/25
See application file for complete search history.

(56) References Cited

U.S. PATENT DOCUMENTS

| | | | |
|---|---|---|---|
| 6,003,013 A | 12/1999 | Boushy et al. | |
| 6,390,917 B1 | 5/2002 | Walker et al. | |
| 6,508,710 B1 | 1/2003 | Paravia et al. | |
| 6,645,068 B1 | 11/2003 | Kelly et al. | |
| 7,384,338 B2 | 6/2008 | Rothschild et al. | |
| 7,406,516 B2 | 7/2008 | Davis et al. | |
| 7,500,916 B2 | 3/2009 | Lieberman et al. | |
| 2002/0147040 A1* | 10/2002 | Walker .................... | G07F 17/32 463/25 |
| 2002/0147049 A1 | 10/2002 | Carter, Sr. | |
| 2002/0177480 A1* | 11/2002 | Rowe .............................. | 463/25 |
| 2002/0196342 A1 | 12/2002 | Walker et al. | |
| 2003/0003988 A1 | 1/2003 | Walker et al. | |
| 2004/0002369 A1 | 1/2004 | Walker et al. | |
| 2004/0048650 A1 | 3/2004 | Mierau | |
| 2004/0248642 A1 | 12/2004 | Rothschild | |

(Continued)

FOREIGN PATENT DOCUMENTS

| | | |
|---|---|---|
| CA | 2 613 335 A1 | 1/2007 |
| CA | 2754756 | 1/2007 |

(Continued)

*Primary Examiner* — Kang Hu
*Assistant Examiner* — Thomas H Henry
(74) *Attorney, Agent, or Firm* — Marger Johnson

(57) ABSTRACT

Embodiments of the present invention are directed to analyzing recorded game information to determine information about a player's behavior. This is accomplished by analyzing the player's actions following a positive increase in credits within credit meter data. This analysis can be utilized in automatically altering a game parameter of the gaming device being played by the player or in providing operators trend information that can be used in modifying the game device or designing future gaming devices. An analysis station may be included in a gaming system using this analysis process to allow an operator to view and manipulate a graphical representation of the credit meter data.

8 Claims, 15 Drawing Sheets

(56) References Cited

U.S. PATENT DOCUMENTS

| | | | | |
|---|---|---|---|---|
| 2005/0043086 | A1 | 2/2005 | Schneider | |
| 2005/0148377 | A1 | 7/2005 | Goldberg et al. | |
| 2006/0040730 | A1 * | 2/2006 | Walker et al. | 463/20 |
| 2007/0060252 | A1 * | 3/2007 | Taylor | G07F 17/3262<br>463/16 |
| 2007/0087818 | A1 * | 4/2007 | Walker et al. | 463/25 |
| 2008/0045317 | A1 | 2/2008 | Seelig et al. | |
| 2008/0102935 | A1 | 5/2008 | Finnimore | |
| 2008/0102946 | A1 | 5/2008 | Amour | |
| 2008/0108433 | A1 | 5/2008 | DiMichele et al. | |
| 2008/0119283 | A1 | 5/2008 | Baerlocher | |
| 2008/0153596 | A1 | 6/2008 | Nguyen | |
| 2008/0227551 | A1 | 9/2008 | Kelly et al. | |
| 2009/0170608 | A1 * | 7/2009 | Herrmann et al. | 463/42 |
| 2010/0124960 | A1 | 5/2010 | Lutnick et al. | |
| 2010/0124967 | A1 | 5/2010 | Lutnick et al. | |

FOREIGN PATENT DOCUMENTS

| | | |
|---|---|---|
| WO | 2004/046859 | 6/2004 |
| WO | WO 2004/046859 A2 | 6/2004 |

* cited by examiner

Game Session - Credit Meter

Initial Credit Input: 40 Credits

| Game No. | Credit Meter | Game No. | Credit Meter |
|---|---|---|---|
| 1 | 38 | 26 | 40 |
| 2 | 36 | 27 | 38 |
| 3 | 34 | 28 | 36 |
| 4 | 32 | 29 | 34 |
| 5 | 40 | 30 | 32 |
| 6 | 38 | 31 | 30 |
| 7 | 36 | 32 | 38 |
| 8 | 32 | 33 | 36 |
| 9 | 30 | 34 | 34 |
| 10 | 28 | 35 | 32 |
| 11 | 26 | 36 | 30 |
| 12 | 28 | 37 | 28 |
| 13 | 26 | 38 | 26 |
| 14 | 24 | 39 | 24 |
| 15 | 22 | 40 | 22 |
| 16 | 40 | 41 | 20 |
| 17 | 38 | 42 | 15 |
| 18 | 36 | 43 | 10 |
| 19 | 34 | 44 | 8 |
| 20 | 32 | 45 | 4 |
| 21 | 30 | 46 | 6 |
| 22 | 28 | 47 | 2 |
| 23 | 46 | 48 | 40 |
| 24 | 44 | 49 | 38 |
| 25 | 42 | 50 | 36 |

FIG. 5A

FIG. 5B

Game Session - Insights

Initial Credit Input: 40 Credits

| Game No. | Game Outcome | Credit Meter | Notes | Game No. | Game Outcome | Credit Meter | Notes |
|---|---|---|---|---|---|---|---|
| 1 | Loss | 38 | Bet 2 Credits/Game | 26 | Loss | 40 | |
| 2 | Loss | 36 | | 27 | Loss | 38 | |
| 3 | Loss | 34 | | 28 | Loss | 36 | |
| 4 | Loss | 32 | | 29 | Loss | 34 | |
| **5** | **Single Bars** | **40** | | 30 | Loss | 32 | |
| 6 | Loss | 38 | | 31 | Loss | 30 | |
| 7 | Loss | 36 | | **32** | **Single Bars** | **38** | |
| 8 | Loss | 32 | | 33 | Loss | 36 | Fast Forward Activated |
| 9 | Loss | 30 | | 34 | Loss | 34 | |
| 10 | Loss | 28 | | 35 | Loss | 32 | |
| 11 | Loss | 26 | | 36 | Loss | 30 | |
| **12** | **Cherries** | **28** | | 37 | Loss | 28 | |
| 13 | Loss | 26 | | 38 | Loss | 26 | |
| 14 | Loss | 24 | | 39 | Loss | 24 | |
| 15 | Loss | 22 | | 40 | Loss | 22 | |
| **16** | **Double Bars** | **40** | | 41 | Loss | 20 | Bet 5 Credits/Game |
| 17 | Loss | 38 | | 42 | Loss | 15 | |
| 18 | Loss | 36 | | 43 | Loss | 10 | Bet 2 Credits/Game |
| 19 | Loss | 34 | | 44 | Loss | 8 | |
| 20 | Loss | 32 | | 45 | Loss | 4 | |
| 21 | Loss | 30 | | 46 | Loss | 6 | |
| 22 | Loss | 28 | | 47 | Loss | 2 | |
| 23 | Loss | 46 | Inserted 20 Credits | **48** | **Triple Bars** | **40** | |
| 24 | Loss | 44 | | 49 | Loss | 38 | Single Game Initiation |
| 25 | Loss | 42 | | 50 | Loss | 36 | Cash Out |

SYSTEM AND METHOD FOR MEASURING GAMING PLAYER BEHAVIOR

CROSS-REFERENCE TO RELATED APPLICATION

This application is a Continuation-in-Part of U.S. patent application Ser. No. 12/616,070, filed Nov. 10, 2009, the contents of which are herein incorporated by reference.

FIELD OF THE INVENTION

This disclosure relates generally to gaming devices, and more particularly to a system and method of measuring player behavior on gaming devices.

BACKGROUND

Casinos have long found it beneficial to closely monitor the financial performance of gaming machines. During the past two decades, casinos have turned to electronic monitoring, in which a communications connection is established between each gaming machine and a central storage location or server. Game performance data is collected at regular intervals, for example, every hour, every shift, or every day, from each game and stored on the central server in an organized way. Later, another computer process examines and consolidates those records into reports. Information recorded may include, wagers made, wagers paid, games played, and even denomination of currency used to play the games.

Often times, the above described accounting system is extended to connect to various entry points of each game. For example, the entry door to a slot machine is connected to a sensor so that any door opening is immediately made known to security personnel to alert them of a potentially unauthorized entry. Other monitored entry points include the currency acceptor door and the coin collection door. This information may be used for instant security purposes and/or stored in an organized way at a central storage location or server.

In most casinos, players are issued identification cards, which may be inserted into any gaming machine during play activities. These identifiers allow the casino to measure the amount of a player's wagers and evaluate their worth. As an incentive to use the identifier card, and to establish loyalty with the casino, valuable players are offered points, free meals, comps, show tickets, cash rebates, and other rewards. Information concerning the player ID and play associated with the player is often recorded on the same server as the above-described accounting information. Alternately, it is recorded on a separate computer server but is still organized in such a way that consolidated reports may be created through analysis of the stored information.

The just-described processes provide useful security alerts and valuable information on how much players spend at each gaming machine. To implement them, each gaming machine is programmed to record the values of interest and transmit them to the central server though a specifically defined language or protocol. Both the sender of the information, the gaming machine in this case, and the receiver of information, in this case the central server, must be capable of understanding the protocol and of formatting transmitted information using the protocol.

These processes and protocols provide accurate accounting records for overall game performance. However, these processes do not help in understanding player behavior. For example, when a player decides to leave a gaming machine, do they do so when they run out of credits on the machine, hit a significant jackpot, or go for a long period of time without hitting a significant jackpot? Do players typically wager maximum credits for long periods and drop to lesser wagers when credits run low, or do they typically change wager sizes throughout a gambling session?

What is needed to answer these questions and others is a way to determine player behavior on a gaming machine. Traditionally, player behavior is estimated through analysis of the above-described data and through direct observation of players as they play the gaming machines. The currently collected information simply does not provide the detailed insights necessary to truly understand behavior and direct observation of players is difficult. This is because players do not like to be watched. Also, it is expensive to station a person to watch each player and even when that is done, it is difficult for the observer to note and record each action taken by the player. Thus, an effective system and method for analyzing player behavior in a rapid and cost-effective way are needed.

BRIEF DESCRIPTION OF THE DRAWINGS

FIG. 5A is an illustrated representation of exemplary credit meter data for a gaming device according to embodiments of the invention.

FIG. 5B is another illustrated representation of the exemplary credit meter data shown in FIG. 5A according to embodiments of the invention.

DETAILED DESCRIPTION

Figure 1A:
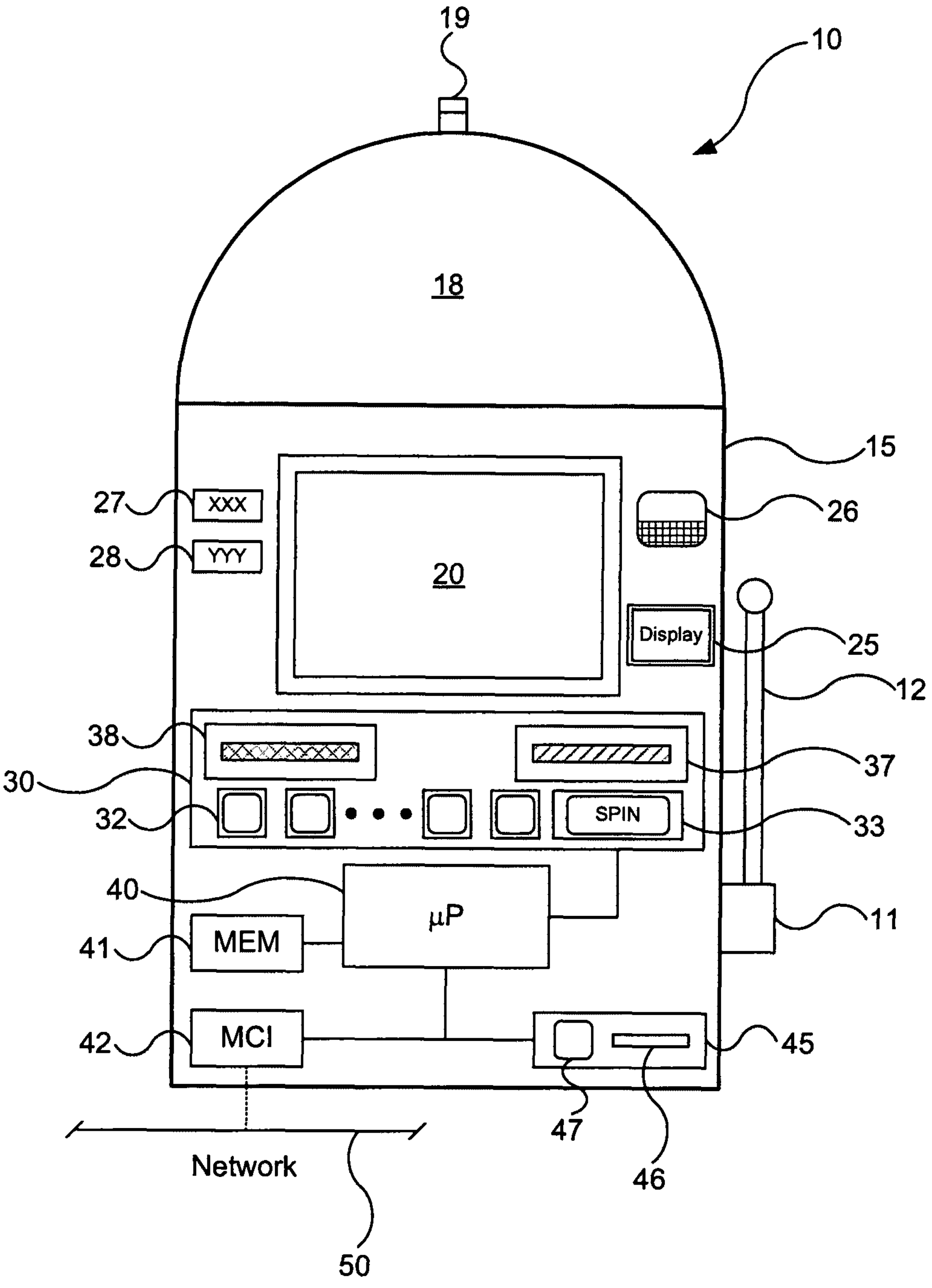
FIG. 1A is a functional block diagram that illustrates a gaming device according to embodiments of the invention.
Figure 1B:
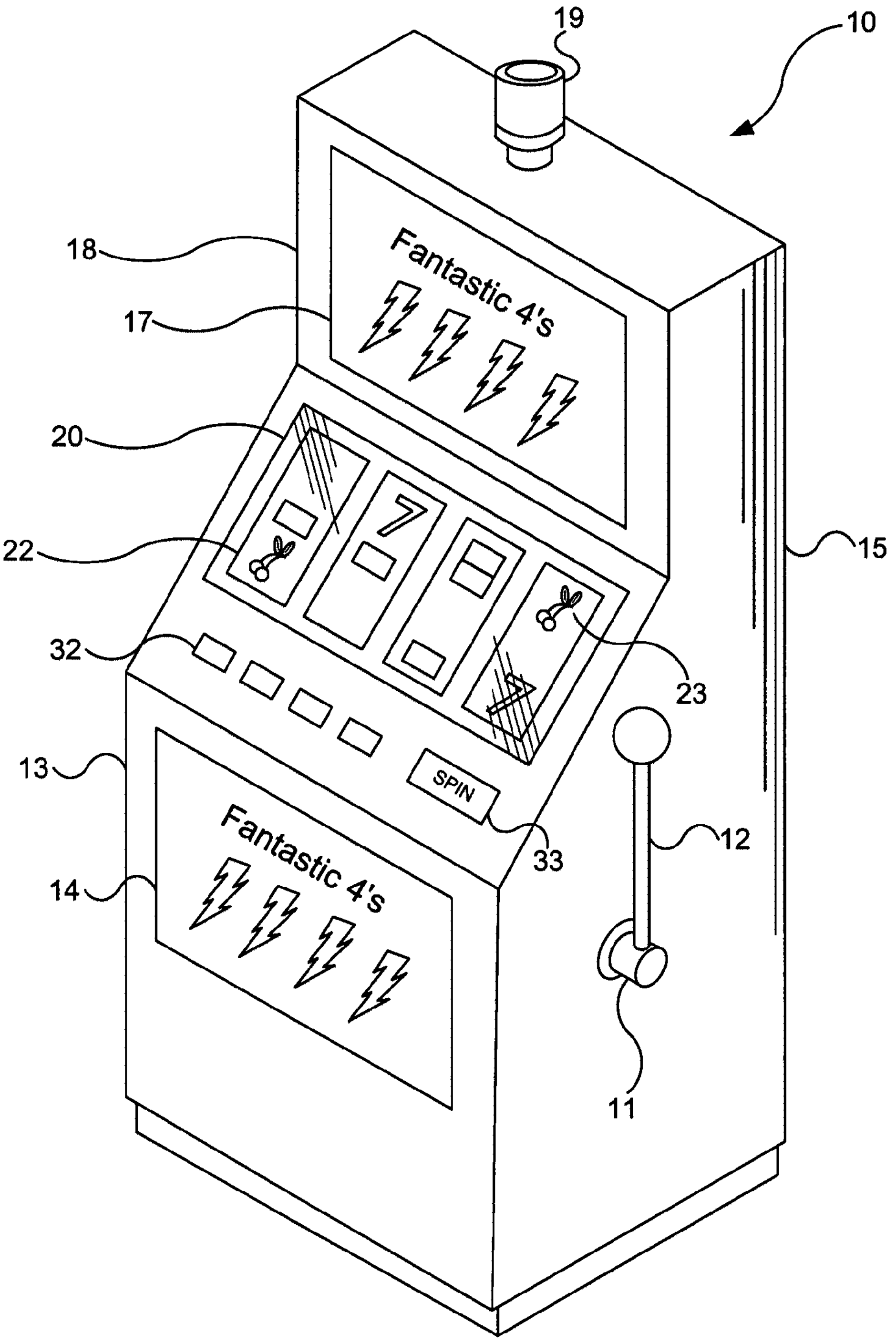
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cash-out.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window." Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

A player typically plays the gaming device 10 by placing a wager and activating an input mechanism to initiate a game associated with the placed wager. As used herein, a gaming event refers to any activity that affects the calculation or display of a game outcome. Game events include interactions occurring between the gaming device 10, the player, and/or a connected game system. Example gaming events include a player inserting a player account card in a gaming device, a double-pay bonus time period activation, a first spinning reel coming to a stop, a player's input to hold a card in a poker hand, etc. A game refers to the calculation and completion of one game outcome. That is, a game includes a single game cycle that begins with the initiation of the wagered upon game and ends with the completion of all activities relating to the wager placed including any intervening bonuses. In other words, a game encompasses all gaming events dependent on a placed wager during an initiated game including all amounts due the player that are paid directly by the gaming machine, or as a manual payment by casino personnel to the player playing that gaming machine. For example, if an item was awarded as a result of a wager that could be saved and used later, the game would encompass the awarding of the item, which is part of the game outcome, but not the later use of that item since the later use would affect a different game outcome. A game session refers to one or more played games. For example, a game session for a particular player may include each game played on a specific gaming device, each game played between insertions of money or credits, each game played between an initial money or credit insertion and a cash-out or zeroing out of credits, each game played during a casino stay, or each game played over a predetermined time period. Alternatively, game sessions may refer to games played by multiple players over a specified time period or event period with respect to a particular gaming device or group of gaming devices.

The player may initially insert monetary bills or previously printed tickets with a credit value into the bill acceptor 37. The player may also put coins into a coin acceptor (not shown) or a credit, debit or casino account card into a card reader/authorizer (not shown). In other embodiments, stored player points or special 'bonus points' awarded to the player or accumulated and/or stored in a player account may be able to be substituted at or transferred to the gaming device 10 for credits or other value. For example, a player may convert stored loyalty points to credits or transfer funds from his bank account, credit card, casino account or other source of funding. The selected source of funding may be selected by the player at time of transfer, determined by the casino at the time of transfer or occur automatically according to a predefined selection process. One of skill in the art will readily see that this invention is useful with all gambling devices, regardless of the manner in which wager value-input is accomplished.

The credit meter 27 displays the numeric credit value of the money or other value inserted, transferred, or stored dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The game may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a game.

If the game does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
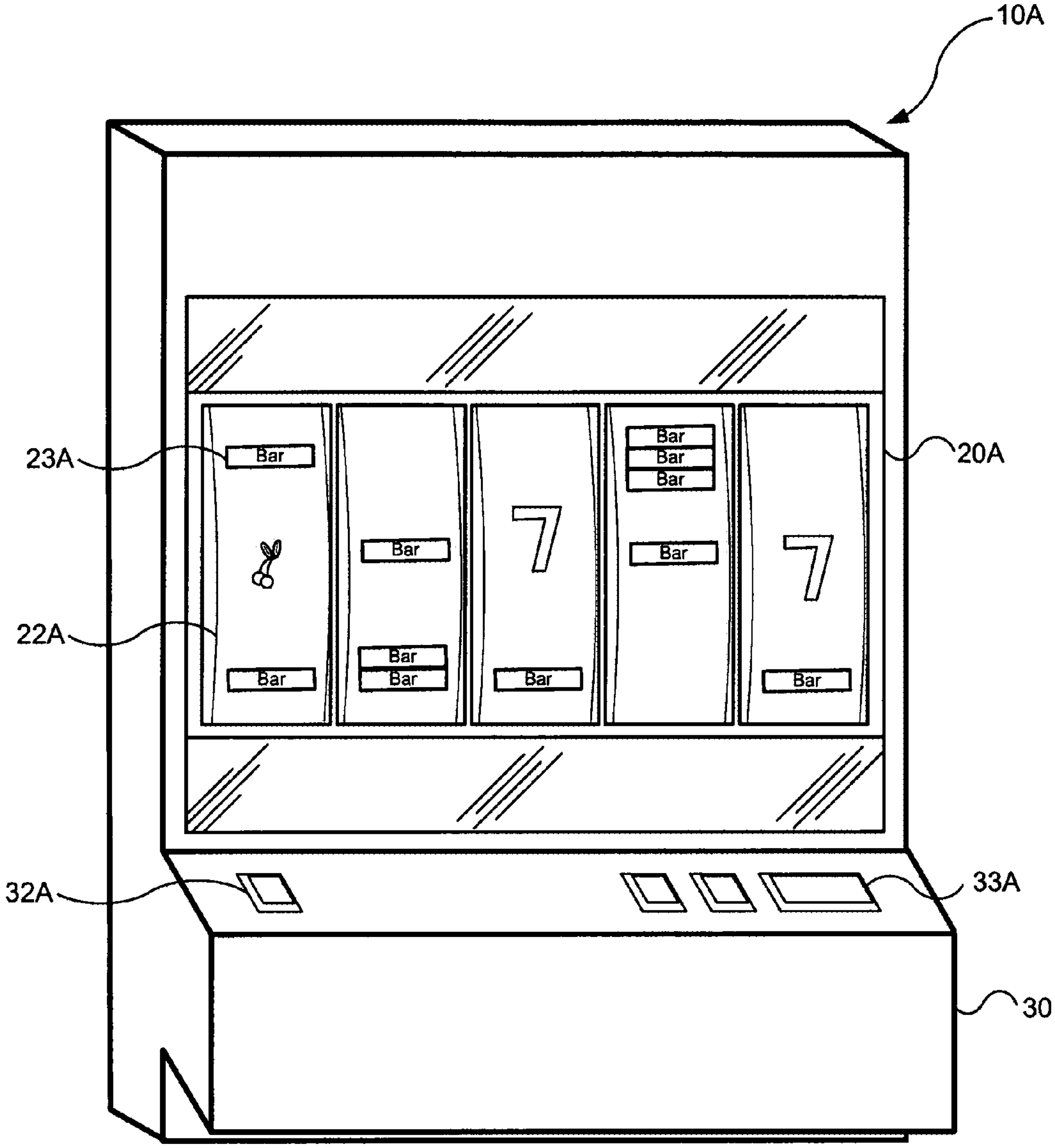
FIGS. 2A, 2B, and 2C are detail diagrams of exemplary types of gaming devices according to embodiments of the invention.
Figure 2B:
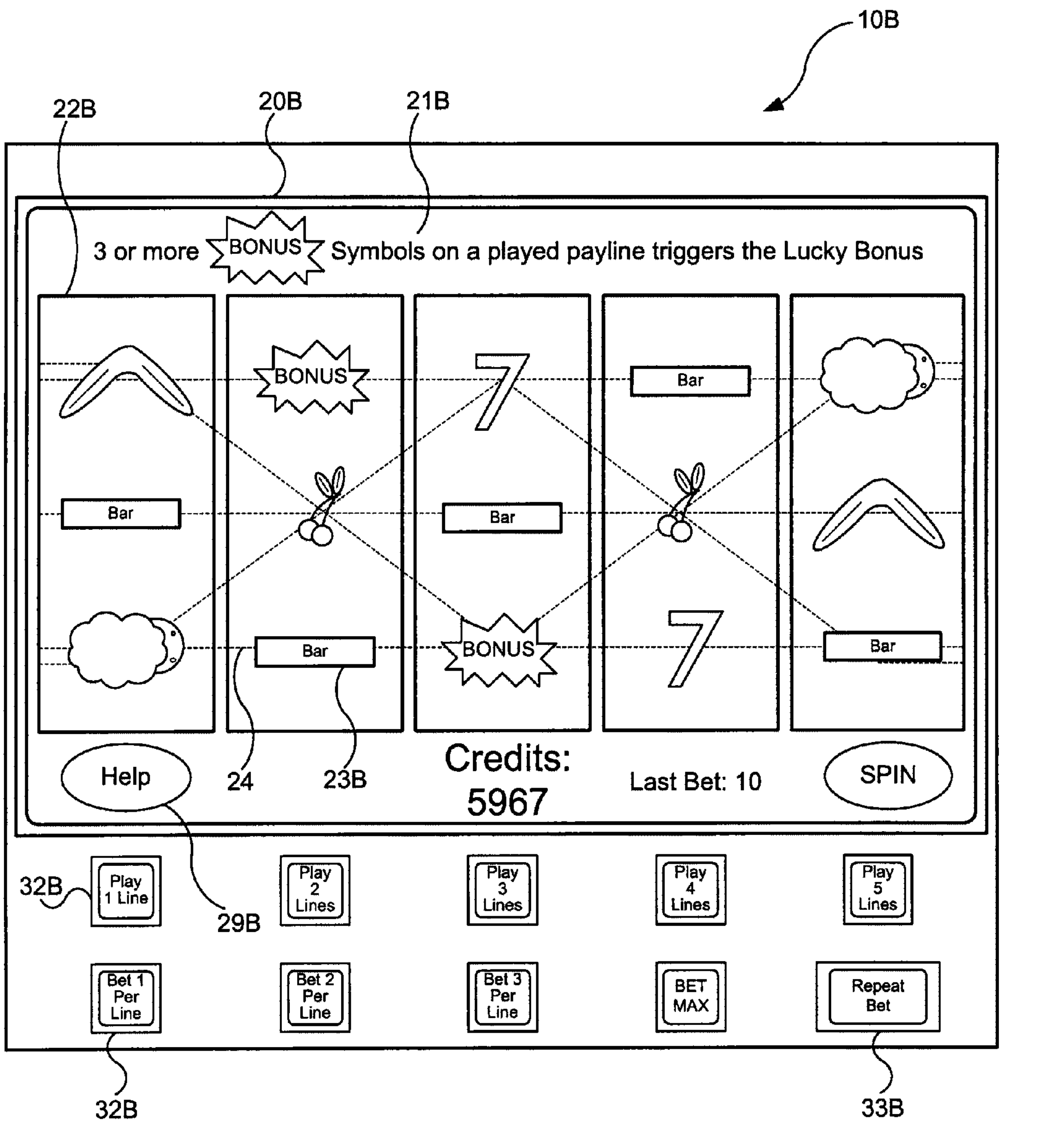
Figure 2C:
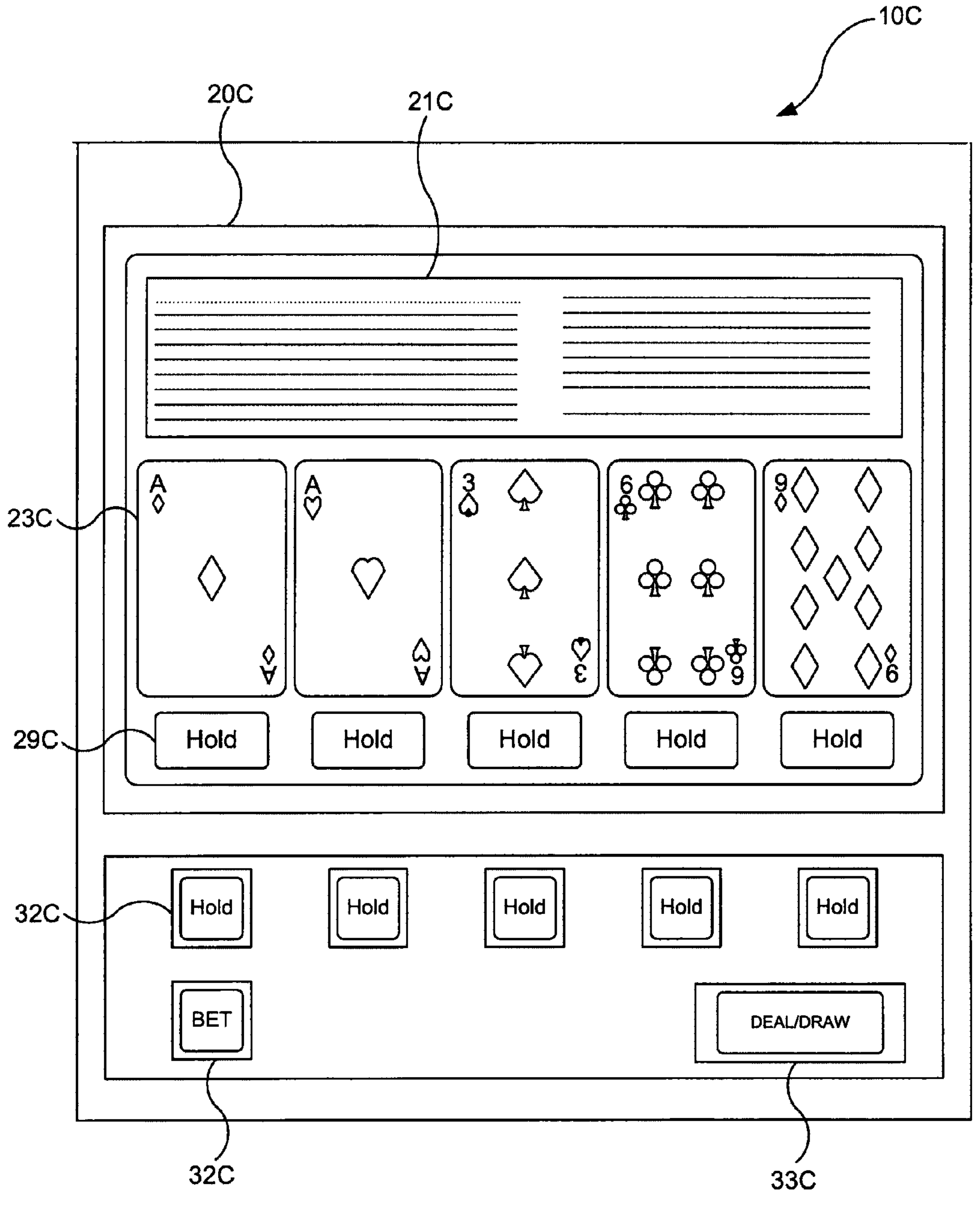

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A game on a spinning reel slot machine 10A typically includes the player pressing the "bet-one" button (one of the game buttons 32A) to wager a desired number of credits followed by pulling the gaming handle 12 (FIG. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touchscreen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the games. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the game ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five games, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a game. A repeat bet or spin button 33B may also be used to initiate each game when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touch-screen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a game after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
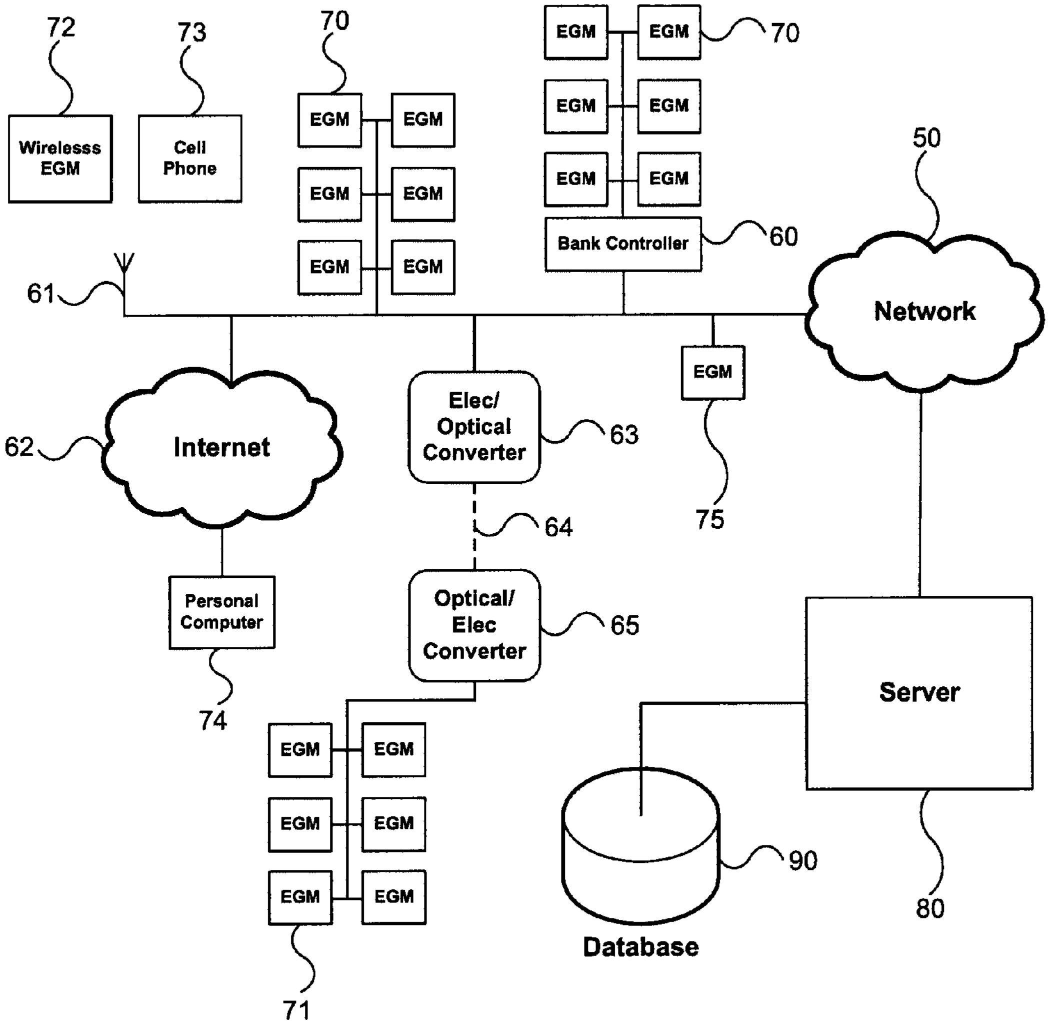
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Because wagering on a gaming device has a strong emotional component, caused in part because of the risk involved in outlaying something of value (usually monetarily based) and the possibility of winning something of even greater value, the player's perception of how events related to this gaming experience unfold partially dictates the player's future wagering choices, from the amounts wagered, to the games they prefer to play, to even the establishment they prefer to play at.

Through an understanding of a player's past behavior, specific desires, likes and dislikes can be learned. Such knowledge is invaluable in improving the player's future experience and thereby creating a more profitable relationship. With this knowledge, profitable changes in game design, floor layout, environmental conditions, loyalty awards, marketing campaigns, employee staffing, and many other areas are possible. One of the most basic, but most difficult to ascertain or measure, is a player's reaction and behavior in relation to the game on the gaming device itself.

Player behavior may be recorded and categorized in various formats. For example, a specific player's behavior may be analyzed, player behavior on a specific gaming device or type of gaming device may be analyzed, time-based or condition-based player behavior may be analyzed, or player behavior for a particular gaming area (such as floor location, casino property, or even geographic location) may be analyzed. Although any specific player's behavior may be analyzed over a short term at a single gaming device, a long term analysis of a player's behavior over many gaming sessions at multiple gaming devices requires that the player be an identified player and their play may be associated and/or stored with the player's data on a player tracking server or database 80 or 90 (FIG. 3). Analysis of specific player's behavior may help a casino better serve that specific player, which may be particularly important not only for traditional, "high-roller" players but to identify players whose affinity, habits and budget makes them candidates for development into high roller status.

For a single gaming device or type of device, the behavior of multiple players may be recorded and analyzed to determine general reactions to gaming device or circumstances occurring on the gaming device. Analysis of this player behavior may help in the design of gaming devices (as mentioned above) or to better understand a player's reaction to certain game outputs. For time-based and location based player behavior analysis, player behavior may be analyzed to determine if players are influenced or affected by gaming at certain times of the day, gaming in certain areas of the casino, or gaming during a promotion or special event occurring at the casino.

Embodiments of this concept are directed to analyzing recorded game information to determine information about a player's behavior. In particular, monitoring and analyzing credit meter data for a gaming session can reveal how players react to the fluctuations in the amount of credits available to wager on the gaming device due to gaming events that occur during the course of the gaming session. Although most players do not primarily focus on the credit meter during game play, the data associated with the credit meter largely reflects significant gaming events that occur on the gaming device. As such, one way to determine player behavior is to analyze the player's actions following particular trends in the credit meter data. For example, a player's actions following a positive increase in credits within credit meter data may reveal how the player reacts to a winning outcome. This analysis may include noting characteristics about the positive increase in credits and correlating those characteristics to the observed player actions. The noted characteristics of the positive increases may include, for instance, the amount of the credit increase, the duration of the credits increase, the distance from the last credit increase, etc.

One way to effectively analyze the credit meter data is to generate a graphical representation of the credit meter data. Graphical representations offer a good vehicle to quickly observe fluctuations in data. Here, a graphical representation of the credit meter data may allow an operator to easily see gaming events that had a significant effect on the amount of credits available to a player to wager on the gaming device. In some embodiments, this graphical representation of the credit meter data includes a line graph with the y-axis representing the amount of credits shown on the credit meter and the x-axis representing a durational quantity such as games played or time. Line graphs are often helpful in displaying trends because they provide interpolation between discrete data points. Additionally, smoothing functions and other curve-fitting techniques may be used to compress large volumes of discrete data points and extrapolate or estimate future trends. However, although line graphs may be useful in certain circumstances, various other graphical representations may be used to effectively display the credit meter data. These graphical representations include scatter plots, histograms, radar graphs, summarized data tables, and many more.

The analysis of the credit meter data can be utilized in providing operators trend information that can be used in modifying the game device or designing future gaming devices, or in automatically altering a game parameter of the gaming device being played by the player. In some embodiments, an analysis station may be included in a gaming system to allow an operator to view and manipulate the credit meter data using one or more of the analysis processes discussed below. These processes provide ways to usefully analyze the data collected so that casino operators and/or game designers can quickly and effectively determine player behavior from the data.

One consideration to address at the outset is what methods and systems are available for collecting the game data in order to determine information about the player's behavior. Any system that is capable of identifying and recording game play data may be used. Several systems that may be particularly well suited to this application are described in co-pending application Ser. No. 12/273,421, entitled SYSTEM FROM PROCESSING GAME ACTIVITY, filed Nov.

18, 2008 (herein referred to as the "Ser. No. 12/273,421 Application"), the teachings of which are incorporated herein by reference. Some of the systems described in the Ser. No. 12/273,421 Application record data transferred via electronic signals within the gaming device that generated by interactions between the player and the gaming device. For example, if the player pressed the "Spin" button with 3 credits wagered, the system may observe the signal instructing 3 credits be deducted from the credit meter and conclude that a wager of 3 credits had been placed on the initiated game.

As discussed in the Ser. No. 12/273,421 Application, an activity processor and activity memory are utilized to record and store game data that results from interactions between the player and the gaming device. The activity process and activity memory may be discrete components within a gaming device or the activity processor may be incorporated into the microprocessor 40 (FIG. 1A) while the activity memory may be incorporated into the memory 41. It may be desirable to have a separate activity processor and activity memory so that the microprocessor 40 and memory 41 can be dedicated to other operations of the gaming device 10*a*. Further, although the activity processor 43 and activity memory 44 (See FIG, 4 of the Ser. No. 12/273,421 Application) are shown as being inside the gaming device 10*a* the activity processor 43 and activity memory 44 can be components in an activity tracking unit that is physically located external to the gaming device 10*a*. The activity tracking unit may be connected to the gaming device via a serial (e.g., SAS) port or other connection port in order to collect the data described above.

The tracked game data may be saved in activity records that make up a session report as discussed in the Ser. No. 12/273,421 Application. Activity records may reflect individual datum points recorded in response to gaming events or interactions between the gaming device and player. For example, each change in the amount of credits available for wagering on the credit meter may be stored in an activity record. A session report includes multiple activity records that occur during a game session. An example session report is included in the Ser. No. 12/273,421 Application. However, session reports may take many different formats, such as those shown in FIGS. 5A and 5B of the present application.

As discussed above, it is useful to graph the credit meter balance of each play session for each player and consolidate that information for categorization and analysis. By measuring the resulting credit meter balance after each wager, an accurate understanding of player experience is obtained. Whether the credit meter ever rises above player-funded wagers made is useful to note, as are relative rises in the credit meter balance, even if the balance never exceeds the amount of money a player has invested in the game. Graphing is often thought of only from a visual perspective. But electronic or other automated analysis of the rise and fall of credit meter balance is the most efficient means of analyzing player experience as volumes of data in a typical casino quickly becomes overwhelming when manual processes are applied.

FIGS. 4A, 4B, 4C, 4D, and 4E are diagrams of exemplary graphical representations of credit meter data for a gaming device according to embodiments of the invention.

Figure 4A:
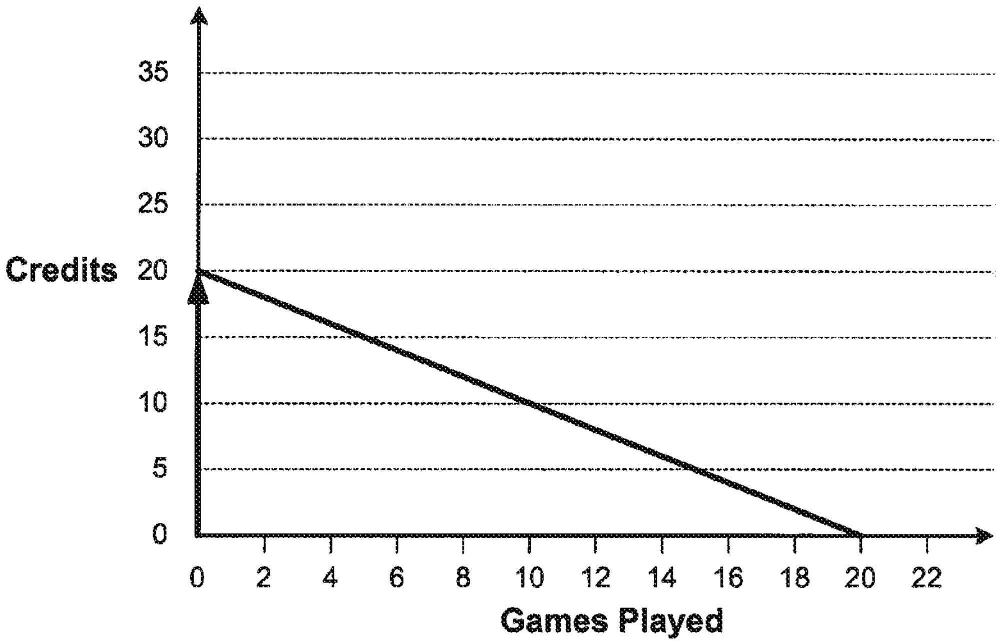
FIGS. 4A, 4B, 4C, 4D, and 4E are diagrams of exemplary graphical representations of credit meter data for a gaming device according to embodiments of the invention.

Referring to FIG. 4A, the illustrated graph displays the credits available on the credit meter for wagering versus the number of games played. Here, the player has inserted 20 credits into the gaming device prior to initiating a game on the gaming device. This insertion is represented by the bold vertical arrow at "game 0" that shows the number of credits on the credit meter increasing from zero to twenty. The player places a wager of one credit per game, but does not receive any winning outcomes. Thus, after 20 games, the credit meter reflects that the player has zero credits. As the graph shows, each wager of one credit reduces the level of the credit meter. Since the player only receives losing outcomes there is no positive upswings in the graph.

The gaming session reflected by this graph is not likely to have left the player feeling very pleased with the gaming experience, since the player has not received a single winning outcome over the course of the gaming session. For short gaming sessions, highly volatile gaming devices, and patient players, these results may not prevent the player from playing the gaming device in the future. However, for many players this experience may dissuade them from playing a similar gaming device in the future. In addition, while the casino may appreciate the quick monetary gain, if the player does not return, they will ultimately lose future revenue from the player. Hence, although casinos want to be profitable, they do not want to sacrifice player content and satisfaction in order to eke out slightly higher profits because these profits will be short lived if many players do not return.

Figure 4B:
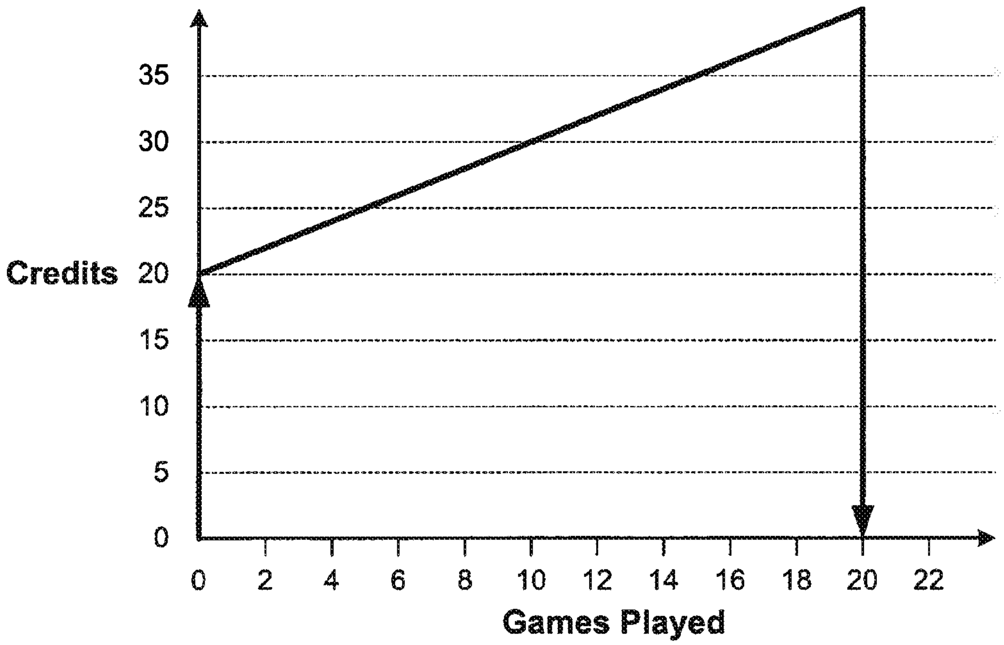

Referring to FIG. 4B, the illustrated graph again displays the credits available on the credit meter for wagering versus the number of games played. Similar to the graph illustrated in FIG. 4A, the player has inserted 20 credits into the gaming device to play a gaming session, and is wagering one credit on each game played. Unlike the previous example, however, the player wins two credits on each game. Thus, the credit meter steadily increases for each game played, which is represented by the positive linear slope of the graphical representation of the credit meter. After twenty games, the player cashes out with 40 credits, which in represented by the bold vertical arrow oriented downward at "game 20" showing the number of credits on the credit meter going from 40 to zero.

Although this string of outcomes is possible on a gaming device, it is not likely to produce a desirable game from the casino's standpoint. Obviously, a casino needs to make money to operate and having gaming machines that only pay out more money than they accept in wagers will not sustain the business. From a player's perspective, they may appreciate taking away more money than they came in with, but some of the excitement of the game play vanishes because they are only receiving small steady wins. The player is likely to return to play the game again, but they will do so to collect money rather than for the fun of it. It turns into a job of sorts. For example, if a gaming device paying 101% with no volatility, meaning a player would earn $1 for every $100 wagered or $1.01 on every $1 bet, and each game lasted 6 seconds, the player wins a penny ($0.01) each 6 second or $6.00 per hour. Game play is now a low wage occupation. Without volatility (e.g., the chance to win something significant with an associated risk of loss), gambling is simply not interesting, even when payouts are more than 100% guaranteed.

Figure 4C:
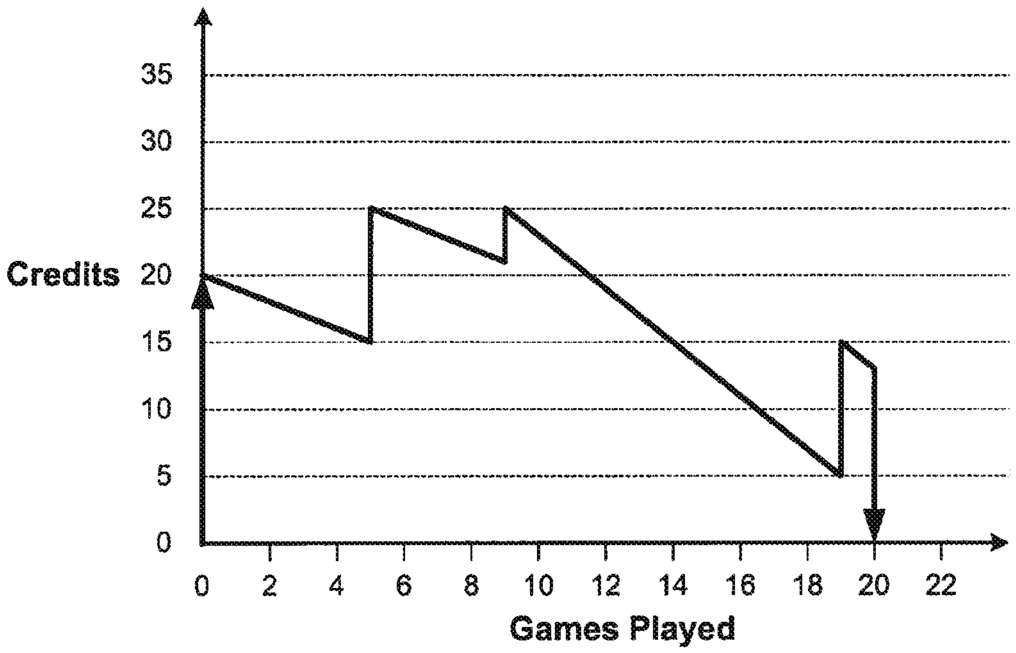

Referring to FIG. 4C, the illustrated graph again displays the credits available on the credit meter for wagering versus the number of games played. However, unlike the examples shown in FIGS. 4A and 4B, play on the gaming device, and hence the credits on the credit meter, show fluctuations representing winning and losing game outcomes as well as other gaming events. Here, the player has again inserted 20 credits into the gaming device and begins by wagering one credit on each game. The first four games result in losing outcomes dropping the credit meter down to 16 credits. On the fifth game, however, the player receives a winning outcome associated with a 10 credit award. Here, the graph illustrates that the credit meter drops another credit to 15 for the one credit wager, but then increases to 25 to reflect the 10 credit win.

The player loses on the next three games, but receives another win after that (game nine of the game session) associated with a four credit award that pushes the credit meter balance back up to 25 credits. At this point, the player increases her wager size to two credits per game. Perhaps the player is feeling lucky with two wins in the first nine games and a credit total greater than the amount of credits originally inserted into the gaming device. In any event, the player receives losing outcomes on the following nine games, dropping her credit meter total down to 7 credits. She receives a 10 credit award on a winning outcome on the nineteenth game boosting the credit meter back to 15 credits. On the twentieth game in the gaming session, the player again wagers two credits and receives a losing outcome. At this point, she cashes out and receives a printed ticket, cash, player account credit, or other type of credit voucher for the 13 credits remaining on the credit meter. This "cash out" activity is shown by the vertical arrow oriented downward taking the credits shown on the credit meter from 13 to zero.

These fluctuations in game play mark times of change in the player's gaming experience, i.e., they show losing sequences turn to winning ones and vice versa. These fluctuations may be referred to as "squiggles" as they are deviations from the consistent linear graph lines shown in FIGS. 4A and 4B. The fluctuations or squiggles represent changes in fortune and are often the reason players play gaming devices. The gaming session illustrated in FIG. 4C may not necessarily define a satisfying player experience, that is, an experience that would cause the player to return to play the gaming device, but the variety of game play as shown by the squiggles are generally more satisfying than a consistent regression or progression of credits.

Although this in only one example of a 20-game gaming session, several inferences may be drawn to the player's behavior based on this credit meter data. For example, it may be noted that the player increased her bet size after two relatively quick wins that put her credit total above an initial investment. Perhaps, the player was feeling lucky at this point and decided to increase her wager amount in the hope of receiving higher paying awards. The player also cashed out with credits left on the meter. Was she dismayed by the nine game losing streak with the increased bet, or was she bored of the game? Since she cashed out after receiving another win, it may be inferred that she felt her luck had changed and that she was going to try a different gaming device while she still had over half the number of credits initially entered into the gaming device. These example inferences are a little difficult to draw based only on this short gaming session. However, if the player was an identified player, many different gaming sessions can be considered to see how the player reacts to certain gaming outcomes and events. Even if the player is not an identified player, multiple gaming sessions may be considered for a single device to analyze how players as a whole are reacting to certain features, game outcomes, or gaming events on the gaming device. These analyses may be very valuable in determining how to improve a player's gaming experience so that they are likely to play the gaming device again and/or return to the gambling venue again because of the positive gaming experience.

For example, suppose initial play information is collected for 1000 first time players that have signed up for a player account and then gambled at least $50.00. These players may be categorized into a group that returned after the initial visit and a group that has yet to return to the casino. Individual or averaged game data from these two groups can be compared to determine if there are any underlying trends in their gaming experience that may have encouraged one group of players to return while discouraging the other group. Perhaps on average, the group of returning first-time players ended their game sessions with higher credit totals on the credit meter. However, maybe the group of returning first-time players simply had more squiggles or fluctuations during their game play. In either case, the collected game data provides insight into player behavior and player preferences.

Figure 4D:
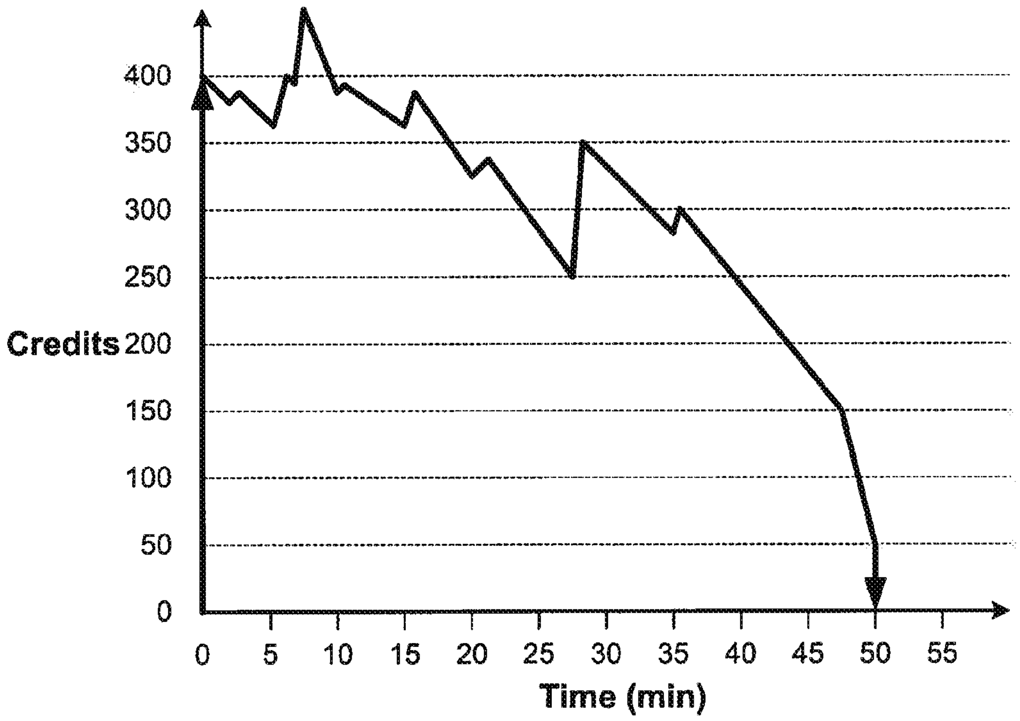

Referring to FIG. 4D, game data information can be collected for a variety of gaming devices and presented graphically in various formats. Here, credit meter data is being graphed versus the passage of time during a gaming session instead of the number of games played during the gaming session. Additionally, this graph has used a curve fitting algorithm to smooth the credit meter data into general trends instead of tracking each datum point. As can be seen on the graph, this gaming session has spanned 50 minutes. Assuming that each game takes between 6 to 10 seconds, a graph of the credit meter data that accounted for each point of data or activity record would likely be difficult to read. However, by using a curve fitting algorithm the general trends and player behavior can still be easily observed. Here, the player initially sustained some losses before receiving a streak of winning outcomes that pushed the credit meter total over the initial credit input of 400 credits. The slopes of the lines provide data as to how the quickly a player is obtaining or losing credits. These are indications of player rate of play and wager size. Generally, as rate of play and/or wager size increases the greater the severity of the slope in the graphs. In addition, the activity records may reflect a player's rate of play and wager size by providing time stamps on the activity records and noting changes in the credits bet per game.

Returning to FIG. 4D, after the player's winning streak from minute 8 to minute 12, the player began a slow losing progression down to 250 credits at minute 27. At this point the player either received a single large win or a streak of several good sized wins, which bumped their credit total up to around 350 credits in about a minute or two. At this point, the player generally received losing outcomes which pushed the credit total lower and lower. During this time, the player may have won multiple small awards. However, using the curve-fitting algorithm these small increases or bumps may be smoothed out to a generally declining graph. When the player got down to 50 credits at about 50 minutes into their gaming session, they decided to cash out. While the player may have ended up down at the end of the gaming session, they may remember their early success or the large win or winning streak in the middle of the gaming session.

Figure 4E:
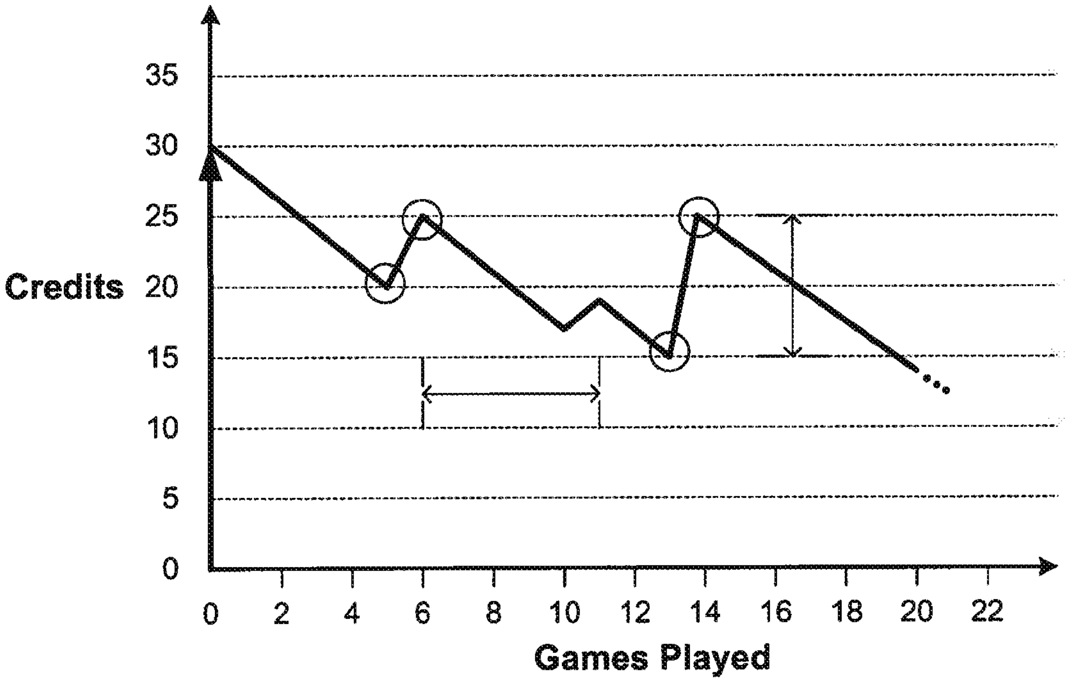

Referring to FIG. 4E, this example graph shows some of the characteristics of a graphical representation of credit meter data that may be used in an analysis of game data to determine player behavior or player preferences. As discussed above, these determinations may be accomplished by analyzing the squiggles or fluctuations in the credit meter data graphed in respect to games played or elapsed time. This analysis may include examining the slope or steepness of the squiggles (i.e., the rate of game play and/or wager per game), the amplitude (height) of the squiggles or positive increases in credit size, and the distance between the squiggles (i.e., the hit frequency). In addition to these characteristics, the game data following a squiggle can be analyzed to determine if the player made any other changes to way that they are playing a game in response to the squiggle. For example, does the player bet more, bet less, cash out, change the number of lines played, increase their rate of game play, etc?

As shown in FIG. 4E, the amplitude of the squiggles may be measured from the base of a credit meter increase to a peak of the credit meter increase. This amplitude may represent the size of a win or series of closely grouped wins. The distance between squiggles may relate to the duration between winning outcomes or credit meter increases. This duration between winning outcomes may be related to hit frequency or at least the frequency of larger valued wins. The circles on the graph illustrate some of the significant changes in fortune experienced by the player during the gaming session illustrated in FIG. 4E. As discussed above, these changes in fortune often provide the excitement and fun that many players seek in a gaming experience.

Figure 5C:
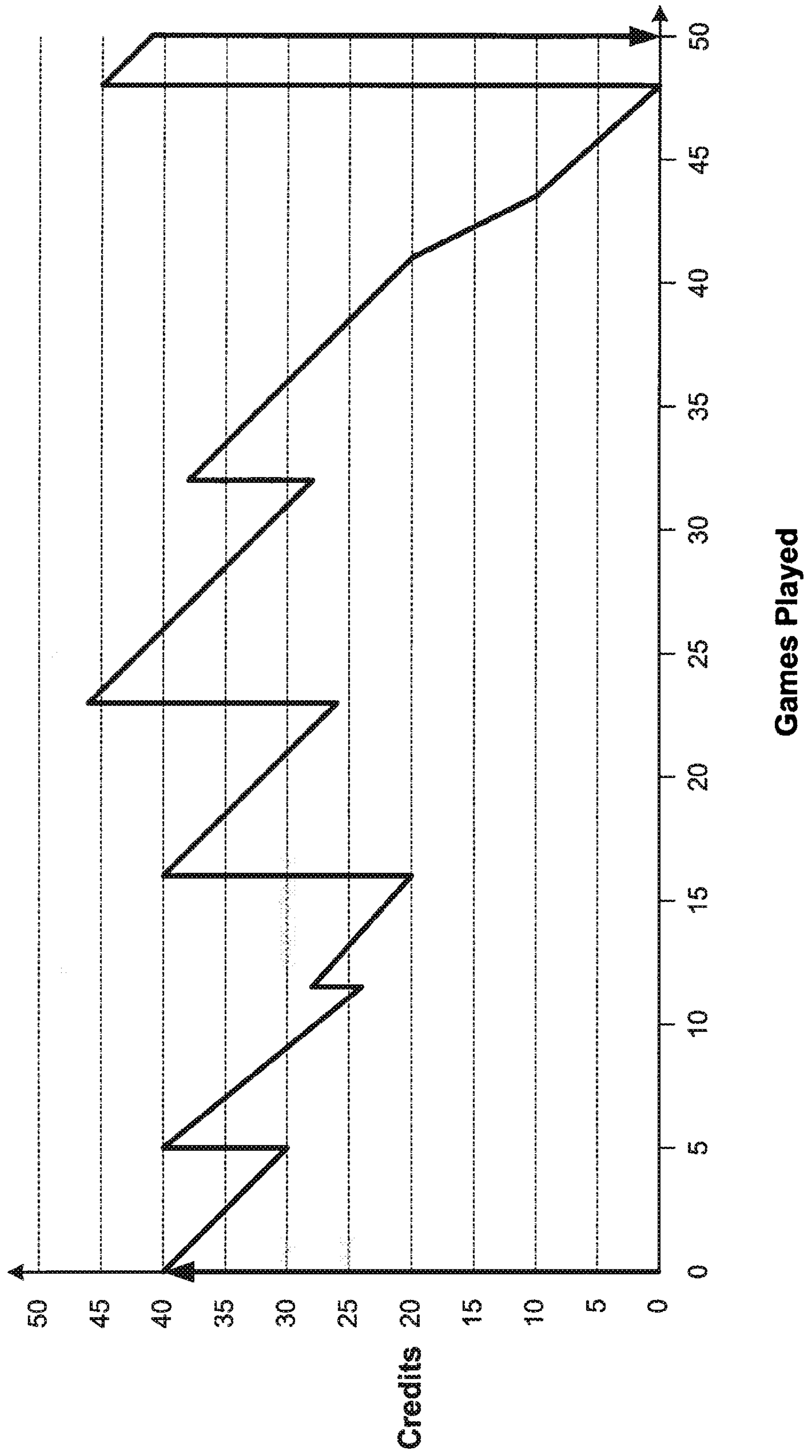
FIG. 5C is a diagram of a graphical representation of the credit meter data shown in FIGS. 5A and 5B according to embodiments of the invention.

FIGS. 5A, 5B, and 5C provide examples of session reports and a related graphical representation of the credit meter data stored in the session reports. FIG. 5A is an illustrated representation of exemplary credit meter data for a gaming device according to embodiments of the invention. FIG. 5B is another illustrated representation of the exemplary credit meter data shown in FIG. 5A according to embodiments of the invention. FIG. 5C is a diagram of a graphical representation of the credit meter data shown in FIGS. 5A and 5B according to embodiments of the invention.

Referring to FIG. 5A, a session report includes activity reports showing a game number and credit meter value associated with the game number. The gaming session illustrated in FIG. 5A includes 50 games and had an initial input of 40 credits. Referring to FIG. 5B, a session report having identical credit meter data to the session report shown in FIG. 5A further includes details about a game outcome and a note section to detail gaming events that are not necessarily captured by the credit meter data. Depending on the level of analysis, either type of session report may prove to be most helpful. In addition, although two types of session reports are shown, many variations of session reports may be used depending on the desired format and level of game information needed for analysis. The additional details of the session report shown in FIG. 5B may reveal gaming events that are not clearly shown by the session report shown in FIG. 5A. For example, the increase in credits at game 23 may be attributed to a winning outcome in session report 5A unless a marker or other indication highlights the fact that the increase was due to the player inserting twenty additional credits into the gaming device. This gaming event is noted in the note section of the session report shown in FIG. 5B. In another example, the session report shown in FIG. 5B notes that the player initiates a fast forward game series at game number 33. While this information may not affect the credit meter data or even the game outcomes, it may provide additional insight into a player's behavior. For instance, the player may have initiated this feature because they were feeling lucky after a winning outcome, or they may have initiated this feature to speed up game play. As can be seen in FIG. 5B, the player changed wager amounts per game twice during the fast forward gaming session. These changes may indicate that a player felt that after receiving several losses in a row they were "due" for a winning outcome. Again, these inferences are preliminary in nature and may be supported by looking at additional player or gaming device data to determine the reasoning behind these changes with more certainty.

Referring to FIG. 5C, the graph of the credit meter data can quickly transform the many numbers of the session reports shown in FIGS. 5A and 5B to a readily understandable graphical format. Here, the credit meter data shows that player received five winning outcomes (and one credit insertion) during the 50 games of the gaming session for a hit frequency of about 10%. The graph also shows that the player had at least half of their originally inserted credits for the majority of the game session. It is only near the end that the player received a significant string of losing outcomes. However, on the player's last credits at game 48, the player received a winning outcome with an award value of 45 credits. After making their initial wager stake back with this one win, and suffering a couple of more losses, the player cashed out.

From an analysis standpoint, the game data, and in particular the credit meter data, can be utilized in providing operators trend information that can be used in modifying the game device or designing future gaming devices, or in automatically altering a game parameter of the gaming device being played by the player. That is, an operator or game designer with access to this data can observe what gaming outcomes and gaming events appeal to a particular player or to an average player. For ease of analysis, an analysis station may be included in a gaming system to allow an operator to view and manipulate the credit meter data. This analysis station may be a terminal connected to a gaming server that communicates with multiple gaming devices over a network as discussed in the Ser. No. 12/273,421 Application. The graphical representation of this data may be shown on a display fitted with a touchscreen so that an operator can scroll through the graphs and other data displays. This touchscreen interface may also allow an operator or analyst to quickly manipulate the data to focus on specific game events or game events in more detail. Additionally, this functionality may allow the operator to move certain game sessions into or out a comparison view with another data graph. Despite the above description, many different types of analysis stations are possible. For example, an operator may utilize a wireless device, cell phone, or personal computer to retrieve and analyze the game data. A secondary screen may also be included to show a graphical representation of the game interface that corresponding to an indicator on the graphical representation of the game data from the gaming session. The operator may move the indicator back and forth along the graph and play a substantially exact representation of any game played on the secondary display. This way, the operator can skip to key points and see how a particular game unfolded.

As discussed above, many different aspects of gaming can be analyzed utilizing embodiments of the present concepts. For example, graphs of singular game sessions may be used or compiled averages of many different gaming sessions. The analysis can focus on the behavior of a specific identified player or a category of player, or can focus on a particular gaming device or type of gaming device. For a specific player, multiple game sessions associated with that player may be analyzed to determine that player's response to certain game stimuli. Although this process may be unwieldy for every player, it may be valuable for high rolling players and/or frequent visiting players. As mentioned above, this method can also be used to determine a group or category of player behaves, such as groups of new players, players playing at specific times of the day, players staying at a casino hotel versus players visiting only to game, etc. Behavior trends relating to certain groups of players may help a casino focus its marketing efforts or provide gaming experiences more in line with the perceived preferences of the players within an identified group.

Alternatively, embodiments of this method may be used to determine player reactions to certain features on a gaming device, to a new gaming device, or to general game outcomes or events. These embodiments may utilize multiple game sessions on a specific gaming device to see how different players perceive an aspect of the gaming device. For example, a new bonus implemented on a bank of gaming devices may have a strong effect on game play or very little effect on game play. An incremental revenue analysis or other analysis may be used to determine the overall value of the new bonus. However, credit meter data of game sessions on the associated game devices may be used to see how the new bonus affects localized game play among players. For instance, do the players place additional wagers to become eligible for the bonus, do they cash out more frequently or less frequently with the bonus implemented, does a proximity meter associated with the bonus have an effect on the duration of an average game session, etc.

One way to compare data from gaming sessions quickly is to overlay graphical representations of gaming sessions either for a particular player, for a particular gaming device, or for gaming sessions constrained by another predefined parameters (time of day, denomination, etc.). The process for overlaying graphical representations is discussed more fully below with respect to FIGS. 7, 8A, and 8B. In addition to overlaying graphical representations, game data may be averaged together prior to being displayed in a graphical format. Observing actual game session data may provide a micro view of particular reactions to certain gaming outcomes and events, while graphs of averaged data may provide more global player preferences.

Because many specific game outcomes do not occur on a regular or predictable basis, some embodiments of this concept may insert a specific game outcome into a game session to observe how a player reacts or behaves in response to this specific outcome. For example, it may be interesting to compare if a player reacts differently to four consecutive wins of five credits versus a single win of 20 credits. Having the flexibility to insert these types of game outcomes into a game session may make such a determination much easier. A casino may use a marketing budget to fund these specific outcome insertions or they may be only offered to specific players, such as players playing on high denomination machines, identified players, new players, etc. The specific wins could be inserted in a similar manner to mystery bonuses so that the game paytable is not affected by the insertion of these outcomes.

In addition to inserting one or more specific game outcomes into a gaming session, an entire game outcome sequence may be replicated for several players. This may be similar to duplicate bridge where players are each presented with a same set cards (here game outcomes). These replicated game sequences may provide a rapid look at a player's response to certain situations by setting the script of outcomes to trigger certain outcome or gaming events. These set game sequences could be inserted into a player's game session, or could be part of a promotional feature where the player is offered an amount of cashless credits to continue gaming or to try a new gaming device. Since the set game sequence is funded entirely by the cashless credits in these scenarios, an analysis of the player's behavior can be gained without risking any of the player's own money. To provide a realistic scenario, however, the player may not be informed that the gaming sequence is predefined.

Although these concepts have been discussed largely in the context of having an operator analyze the reactions of players to certain gaming circumstances, other embodiments of this concept provide a gaming device that dynamically tracks and analyzes these reactions so that it can automatically alter at least one game parameter during the gaming session or for a future game session. Here, the game device or game system may have a stored set of trigger criteria that it uses to compare to the dynamically recorded game data and set game parameters. For example, a trigger criterion may specify that a player's repeated increase in wager amount may indicate a player's desire for additional volatility and that an increase of wager amount will result in the gaming device utilizing a higher volatility paytable until the wager amount is reduced. When the gaming device recognizes that a player is increasing their wager amount from the recorded game data, the gaming device may automatically implement a higher volatility paytable in response to the data analysis in view of the trigger criterion.

Figure 6:
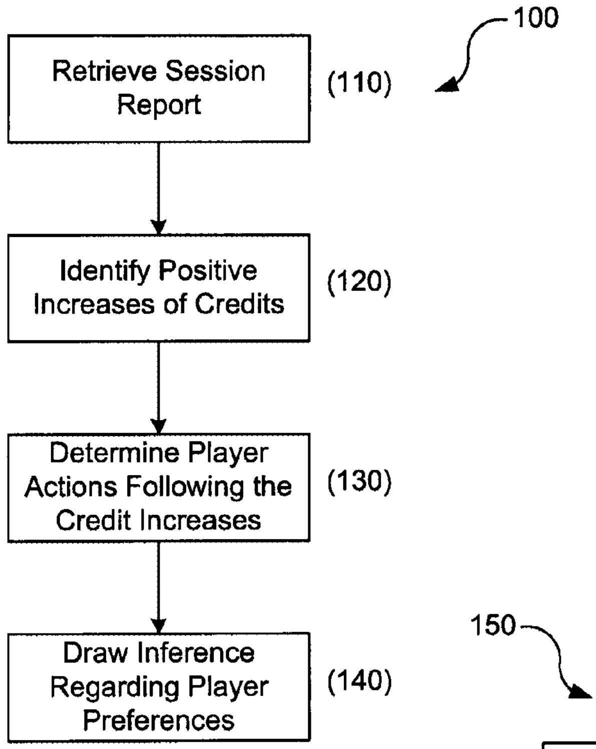
FIG. 6 is a flow diagram of a method analyzing player behavior based on play of a gaming device according to embodiments of the invention.

FIG. 6 is a flow diagram of a method analyzing player behavior based on play of a gaming device according to embodiments of the invention.

Referring to FIG. 6, flow 100 begins by retrieving a session report including credit meter data for a game session in process (110). Positive increases of credits (squiggles) are then identified within the retrieved session report in process (120). Here, a computerized algorithm may be used to quickly parse through the credit meter data included in the session report to identify the squiggles. Alternatively, a graphical representation of the credit meter data may be generated so that an operator can identify the squiggles. In process (130), the credit meter data and other game data is observed to determine the players actions and behavior following the credit increases. These actions by the player may reflect the player's response to the credit meter increases. As such, at least one inference regarding player preference may be drawn in process (140). As mentioned above, this inference may be specific to a particular player or may be an averaged response to the game outcome or game event that triggered the increase in credits.

Figure 7:
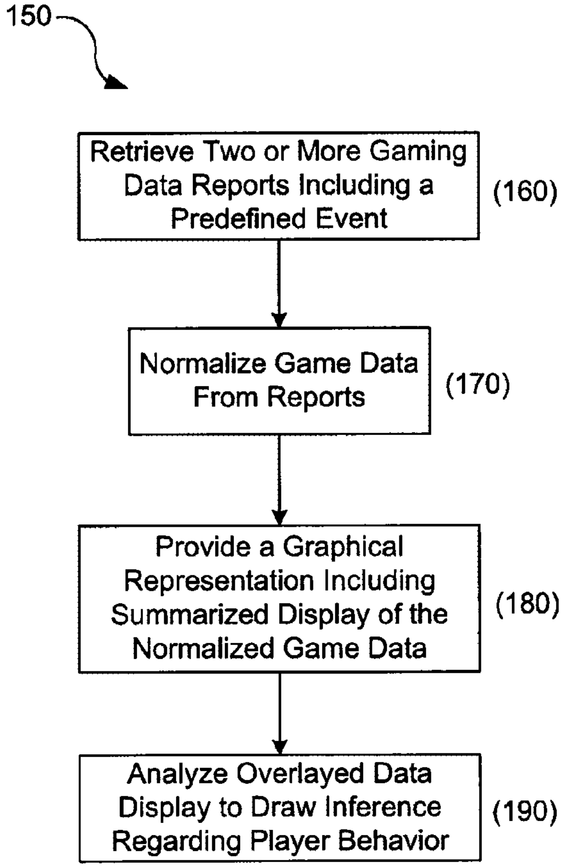
FIG. 7 is a flow diagram of a method analyzing player behavior based on a comparison of game data obtained from gaming devices according to embodiments of the invention.

FIG. 7 is a flow diagram of a method analyzing player behavior based on a comparison of game data obtained from gaming devices according to embodiments of the invention.

Referring to FIG. 7, flow 150 begins by retrieving two or more gaming data reports that include a predefined event in process (160). For example, it may be desired to see how players react to winning a wheel bonus on a gaming device. Here, two or more gaming sessions that include the awarding of the wheel bonus may be retrieved. In process (170), the game data from the gaming data reports is normalized. The data is normalized so that the game data can accurately be compared against each other. In the above example, suppose that one set of retrieved game data with a wheel bonus is obtained when a player is wagering 5 credits per line on a five line gaming device while a second set of retrieved game data with a wheel bonus is obtained where a player is wagering one credit on a single line. Obviously, overlaying these two graphs would be difficult. Hence, the data from at least one of the sets of game data is scaled so that it can be compared side by side with the other sets of game data. In process (180) a graphical representation including summarized display of the normalized game data is provided. Here, the graphical representation may be summarized or focused around the specified gaming event. While a significant range of data around the specified gaming event may still be used, distant data before or after the specified gaming event may bear little correlation to the event and hence may be extraneous to the analysis. In process (190), the graphical representations may be overlaid over one another and analyzed to draw at least one inference regarding player behavior. While this example flow 150 focuses on determining inferences for a particular gaming event, similar processes may be used in a more general sense to observe how players react to other circumstances. For example, graphical representations of game sessions for players that just signed up for a player account may be compared to one another to determine how these new players responded to squiggles in the credit meter data during their first identified game sessions.

Figure 8A:
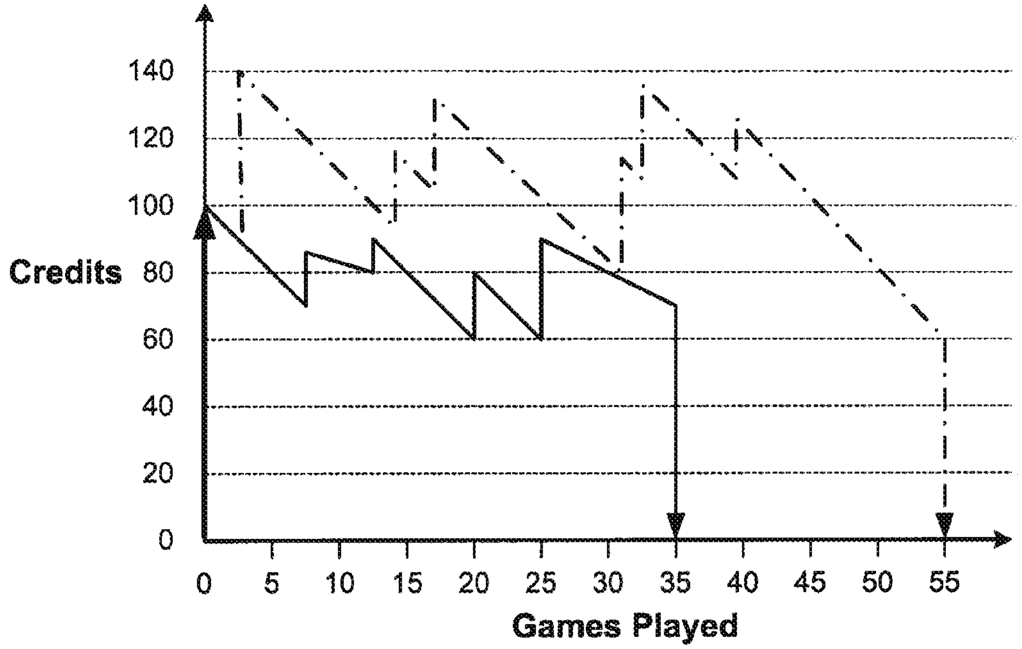
FIG. 8A is a diagram of an exemplary graphical comparison of game data from gaming devices according to embodiments of the invention.

FIG. 8A is a diagram of an exemplary graphical comparison of game data from gaming devices according to embodiments of the invention.

Referring to FIG. 8A, graphical representations of two sets of credit meter data are overlaid to compare a player's reactions. Here, for example, an inference may be made that the player is more likely to play longer when they received a more volatile gaming experience or when they received large enough wins that placed the amount of credits near the amount of credits initially inputted into the gaming device. Note that the player actually cashes out with less credits in the dashed line gaming session, but may have had a more pleasing gaming experience than the player had when they immediately dipped below 100 credits and only received small awards while their overall credit reserves gradually diminished.

Figure 8B:
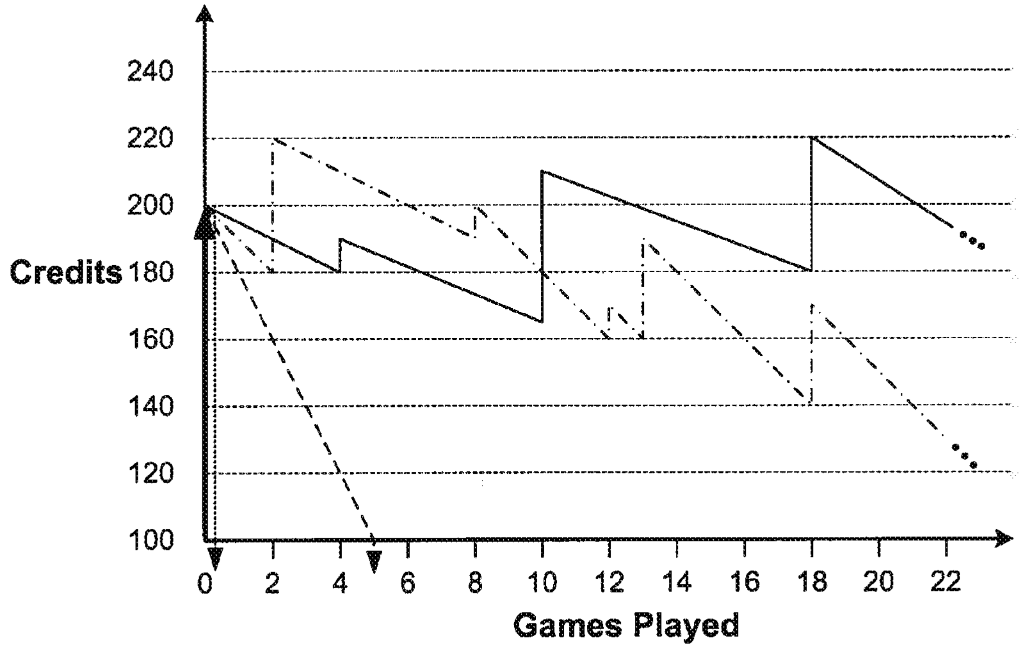
FIG. 8B is a diagram of an exemplary graphical comparison of game data associated with a predefined gaming event according to embodiments of the invention.

FIG. 8B is a diagram of an exemplary graphical comparison of game data associated with a predefined gaming event according to embodiments of the invention.

Referring to FIG. 8B, graphical representations of normalized game data surrounding a large win is analyzed. Here, the specific gaming event that is to be analyzed is a significant win or increase in credits on the credit meter. To accurately compare the different game sessions, the large game data is normalized so that the win size for each game session is 100 credits. Here, four different reactions to this win is observes. One player simply cashed out (the dotted line at game 0) after receiving the large award. A second player bet the normalized equivalent of 20 credits per game for five games, which all resulted in losing outcomes, and then cashed out (the second dashed line). The other two players appear to have maintained a more modest wagering scheme and are playing beyond the 20 games specified for this analysis. An inference from this comparison data may indicate that players will generally not simply cash out after a large award, although additional game sessions may make this inference more certain.

In addition to providing a graphical representation of credits ultimately won during a game, some embodiments of this concept provide a graphical representation of a progression of credits won during a game. A progression of awarded credits typically occurs during certain types of bonuses where the player enters a bonus and has several interactions with the gaming device that result in multiple prizes being awarded to the player as part of the same game. Although embodiments that only show the net gain or loss of the credit meter for a game may accurately track the player experience with regard to the gains and losses on the credit meter, these embodiments may be ignoring valuable information about the type of wins and how the player reacts to the different types of wins. The following two figures (FIGS. 9A and 9B) illustrate two similar gaming sessions with different types of large wins.

Figure 9A:
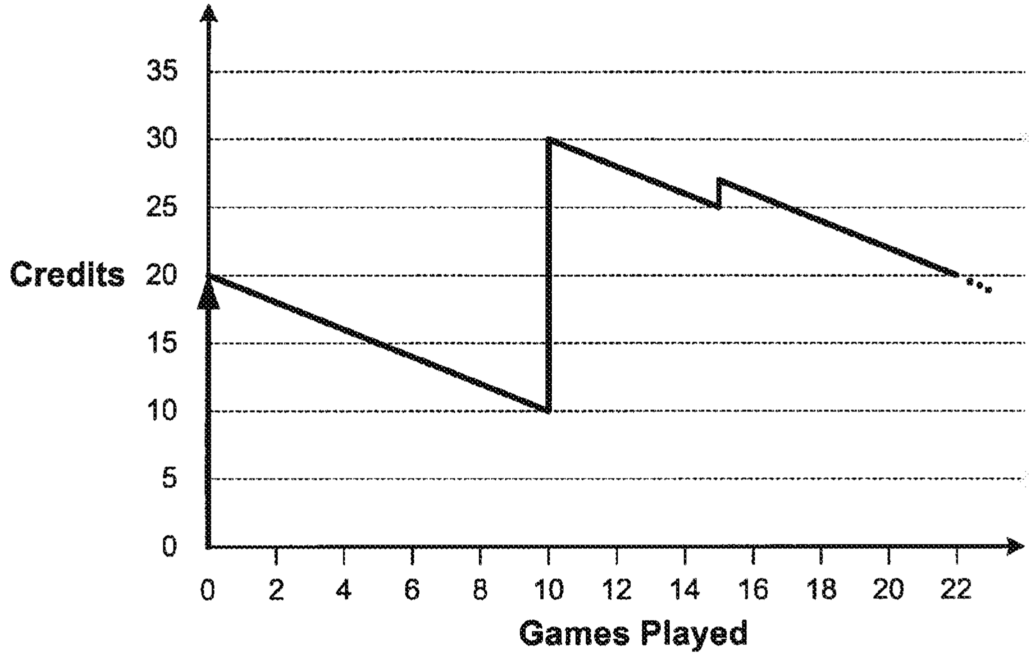
FIGS. 9A and 9B are diagrams of exemplary graphical representations of credit meter data for a gaming device according to embodiments of the invention.
Figure 9B:
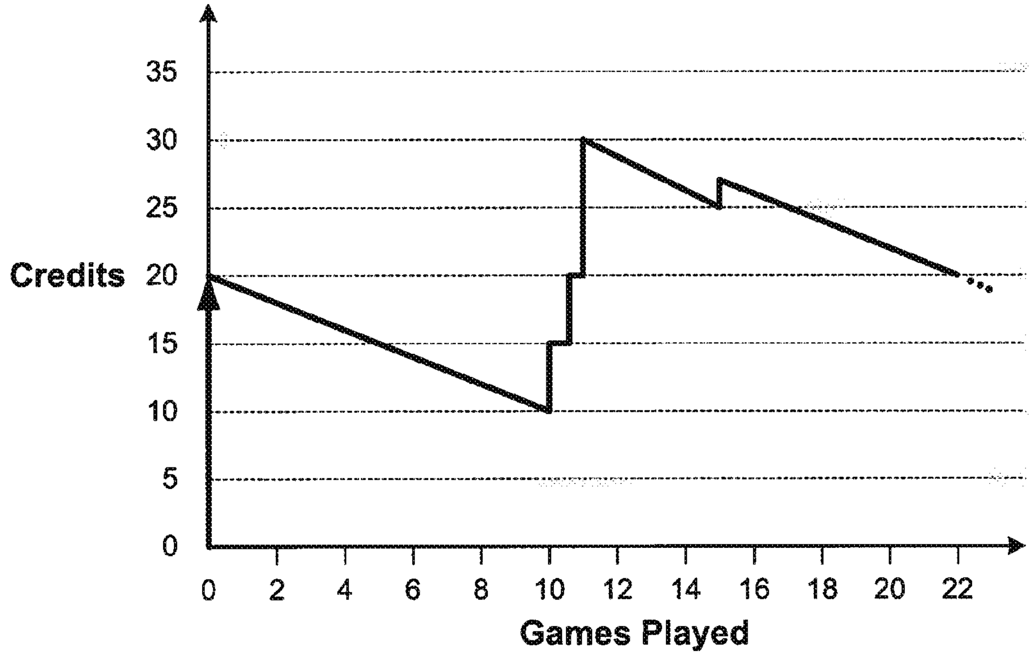

FIGS. 9A and 9B are diagrams of exemplary graphical representations of credit meter data for a gaming device according to embodiments of the invention.

Referring to FIG. 9A, a gaming session begins with a player inserting 20 credits into the gaming device, as represented by the vertical arrow at game number zero. The player wagers a single credit per game and receives losing outcomes for the first nine games of the gaming session. On the tenth game, the player receives a bonus win that awards the player a one-time prize of 20 credits. This award is represented by the vertical line at game number ten.

Referring to FIG. 9B, the illustrated gaming session begins similarly to the gaming session shown in FIG. 9A. However, when the bonus is won in game ten, the player enters a multi-stage bonus. In the first stage of the bonus, the player wins 5 credits, which is represented by the first (leftmost) vertical line at game ten. Thereafter, the player wins another 5 credits in the second stage of the bonus at game 10. The player then proceeds to win 10 credits during the third stage of the bonus, after which time the bonus ends. Although the graph illustrated in FIG. 9B shows the credit meter being incremented with each stage of the multi-stage bonus in game ten, the displayed credit meter on the gaming device may not actually reflect the increase in credits for each stage of the bonus. Rather, the displayed credit meter may be rolled up with the total number of credits won during the bonus after the bonus has ended. The gaming device may, however, record each of these incremental credit increases in these embodiments.

As discussed above, displaying the incremental credits won during a multi-stage bonus or other gaming event may be advantageous in determining player behavior since a player may react differently to winning a certain amount of credits all at once versus winning the same number of credits in a rolling or incremental manner during a multi-stage bonus or gaming event. For example, it may be analyzed what a particular player does after receiving a bonus win of 100 credits from a single bonus wheel spin versus what that player does after receiving ten free spins that results in a total bonus win of 100 credits to determine which type of bonus the player appears to prefer. If such an analysis is completed for an identified player, a gaming device may alter how it presents bonuses to that player when the player identifies herself to the gaming device. On a larger scale, casinos and game designers can make game configuration choices based on analyses of game sessions for multiple players.

Although credit meter data may be a focal point for analyzing behavior, other measured or observed factors may be associated with the credit meter data to put this data in context. For example, data about an identified player's typical habits may place certain player actions in better context than by only looking at the credit meter data. For instance, most players are limited by either time or money. A well-to-do person might have ample cash but only an hour in which to gamble. Another person might have plenty of time to gamble but limited funds. Each player's appetite for risk or volatility varies according to their budget limitations. For example, a time-limited player might enjoy somewhat lower volatility games during the initial part of his visit but appreciate higher volatility as his time draws to an end. He's seeking the rush of the gamble and if he's spent less than his traditional budget, he might want to take greater risk and either win an important amount or lose his remaining discretionary funds.

A budget-bound person could be exactly the opposite. She may like risk when her pockets are full, but would prefer to have lower risk as opposed to running out of money completely. This is especially true when a player visits a casino with others. In another example, two couples (Bob and Carol, and Ted and Alice) decide to hit the casino on a Friday night. They've hired a baby-sitter and have four hours to gamble. Each has about $75 to spend. Bob's luck falls behind the others and after only an hour, he's down to $20. His choice may be to either slow down his losses or to find something else to do when his funds are gone while the others continue to play. Now Bob could stop playing for a while or he could drop his wager size. However, without the knowledge of this budget issue, it may be concluded that Bob is bored, when he is really just short of funds.

This difference can be deduced in a number of ways if other factors are analyzed in addition to the credit meter data. For example, it might be known that Bob and Carol are married. It might also be known that Ted and Alice often visit the casino with Bob and Carol. By reviewing historical records, the analysis of Bob's gaming session may include data that these couples typically visit the casino for about four hour sessions and spend an average of $75. Thus, during the analysis of Bob's gaming session, it may be notices that Bob has lost money disproportionately fast and may be near the end of the amount he typically wagers during a visit. If this analysis is made during Bob's gaming session, the gaming device that Bob is currently playing may be instructed to lower the volatility of the game, raise the payback percentage of the game, or both.

In this example, the budget issue may have to be tracked between multiple game devices. In other examples, a budget consideration may be tracked beyond a single game session, such as over a predefined time period. For example, if Bob gets paid twice per month, his appetite for volatility and risk might be significantly stronger the day after getting paid than it is two weeks later when payday hasn't quite arrived.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method of modifying a pay table of an electronic gaming device based on play of a game on the electronic gaming device, the electronic gaming device being of the type having a credit meter that records positive increases of credits applied by the player and as a result of awards and a negative decrease of credits as a result of a wager made by the player, the electronic including: a housing; a display device supported by the housing; a plurality of input devices supported by the housing, the plurality of input devices including a physical item acceptor and at least one of: a touch screen and at least one button; and an electronic processing device supported by the housing, the electronic processing device configured to operate with the display device and the plurality of input devices to receive currency via the physical item acceptor, the currency having a monetary value, and to receive, via at least one of the plurality of input devices, a wager based at least in part on the monetary value, the method comprising:

retrieving, via a processor in communication with the electronic gaming device, a session report including credit meter data associated with a gaming session by the player, the credit meter data including each change in value on the credit meter;

receiving wagers from the player of the electronic gaming device;

initiating a game on the electronic gaming device for each wager made in response to actuation of one of the input devices;

generating a game outcome comprising a plurality of symbols based on a paytable in the electronic gaming device for each game played;

displaying a game outcome comprising the plurality of symbols on the display device each time a game is played;

associating each wager that results in a winning outcome with the plurality of symbols resulting from the game on which the winning wager was made;

associating each wager that results in a losing outcome with an indication of a loss for the game on which the losing wager was made;

including the associated wagers and symbols resulting in a winning outcome in the session report;

including the associated wagers and loss indications for losing outcome in the session report;

identifying repeated positive increases of credits within the credit meter data;

associating each identified increase with a corresponding game in which the credits increased and with the time of the game at which the credits increased;

determining that the repeated positive increases of credits resulted from repeated increases in the amount wagered;

drawing at least one inference regarding player game preference based on the determined player actions, namely that the player would prefer a higher volatility game;

automatically changing the paytable in the electronic gaming device to a different paytable having higher volatility in response to the inference; and permitting the player to cash out any remaining credits on the credit meter after each game played.

2. The method of claim 1, further comprising measuring the amplitude of the positive increases of credits.

3. The method of claim 2, further comprising measuring the range between sequential positive increases of credits.

4. The method of claim 1, further comprising graphing the credit meter data.

5. The method of claim 1, wherein identifying positive increases of credits within the credit meter data includes identifying positive increase of credits above a predefined threshold within the credit meter data.

6. The method of claim 5, wherein the predefined threshold is a positive increase of credits greater than a wager amount associated with a game corresponding to the positive increase of credits.

7. A method of modifying a paytable of an electronic gaming device in response to actions of a player playing a game on the electronic gaming device, the electronic gaming device including: a housing; a display device supported by the housing; a plurality of input devices supported by the housing, the plurality of input devices including a physical item acceptor and at least one of: a touch screen and at least one button; and an electronic processing device supported by the housing, the electronic processing device configured to operate with the display device and the plurality of input devices to receive currency via the physical item acceptor, the currency having a monetary value, and to receive, via at least one of the plurality of input devices, a wager based at least in part on the monetary value, the method comprising:

recording changes in magnitude of a credit meter responsive to credits applied to the credit meter by the player, credits deducted from the credit meter as a result of wagers on the game, and awards applied to the credit meter;

retrieving, via a processor in communication with the electronic gaming device, a session report including each change in value on the credit meter associated with a gaming session;

receiving wagers from the player of the electronic gaming device;

initiating a game on the electronic gaming device for each wager made in response to actuation of one of the input devices;

generating a game outcome comprising a plurality of symbols based on a paytable in the electronic gaming device for each game played;

displaying a game outcome comprising the plurality of symbols on the display device each time a game is played;

generating associated wager data comprising:

associating each wager that results in a winning outcome with the plurality of symbols resulting from the game on which the winning wager was made; and associating each wager that results in a losing outcome with an indication of a loss for the game on which the losing wager was made;

including the associated wagers and symbols resulting in a winning outcome in the session report;

including the associated wagers and loss indications for losing outcome in the session report;

generating a graphical representation of the credit meter magnitude changes in which the vertical axis represents each change in value on the credit meter and the horizontal axis represents each game in which the value on the credit meter changed and the time of the game at which the value on the credit meter changed;

identifying at least one action taken by a player immediately following repeated positive increases of credits resulting from increases in the amount wagered within the credit meter magnitude changes and the associated wager data, namely a reduced wager amount;

automatically changing the paytable in the electronic gaming device to a different paytable having a higher volatility in response to the increases in the amount wagered until the wager amount is reduced; and permitting the player to cash out any remaining credits on the credit meter after each game played.

8. The method of claim 7, further comprising curve fitting the graphical representation of the credit meter magnitude changes.

* * * * *